United States Patent
Andronikov et al.

(10) Patent No.: US 8,737,591 B2
(45) Date of Patent: May 27, 2014

(54) METHOD AND APPARATUS OF A VOICE-RESPONSE DIRECTORY ASSISTANCE SYSTEM HAVING A TARGETED ADVERTISING ENGINE

(75) Inventors: Alec S. Andronikov, San Francisco, CA (US); Alexey Bulavin, St. Petersburg (RU); Michael Loftus, Los Altos, CA (US); Derek Merrill, San Francisco, CA (US); Barbra Higgins, Oakland, CA (US); Helen Lambert, San Jose, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1179 days.

(21) Appl. No.: 11/586,204

(22) Filed: Oct. 24, 2006

(65) Prior Publication Data

US 2007/0129054 A1 Jun. 7, 2007

Related U.S. Application Data

(60) Provisional application No. 60/731,330, filed on Oct. 28, 2005.

(51) Int. Cl.
H04M 3/42 (2006.01)

(52) U.S. Cl.
USPC ............................... 379/218.01; 379/201.01

(58) Field of Classification Search
USPC ............. 379/218.01, 114.13, 201.01, 211.01, 379/213.01, 212.01
See application file for complete search history.

(56) References Cited

U.S. PATENT DOCUMENTS

| | | | | |
|---|---|---|---|---|
| 5,852,775 A * | 12/1998 | Hidary | ....................... | 455/412.1 |
| 6,084,628 A * | 7/2000 | Sawyer | ........................... | 725/34 |
| 6,587,138 B1 * | 7/2003 | Vogt et al. | .................. | 348/14.12 |
| 6,614,896 B1 * | 9/2003 | Rao | ........................... | 379/209.01 |
| 6,856,673 B1 * | 2/2005 | Banks et al. | ............. | 379/114.13 |
| 7,187,761 B2 * | 3/2007 | Bookstaff | ................ | 379/201.01 |
| 7,227,936 B2 * | 6/2007 | Bookstaff | ................ | 379/201.01 |
| 7,424,442 B2 * | 9/2008 | Wong et al. | ................ | 705/14.68 |
| 7,453,998 B2 * | 11/2008 | Jacob et al. | ............... | 379/114.05 |
| 7,573,993 B2 * | 8/2009 | Bookstaff | ................ | 379/201.01 |
| 7,729,938 B2 * | 6/2010 | Lauffer | ........................ | 705/7.13 |
| 8,078,977 B2 * | 12/2011 | Bookstaff | ..................... | 715/748 |
| 8,107,602 B2 * | 1/2012 | Wolmuth | .................... | 379/88.22 |
| 2002/0051521 A1 * | 5/2002 | Patrick | ........................ | 379/88.01 |

(Continued)

OTHER PUBLICATIONS

Written Opinion received from the International Searching Authority for International Application No. PCT/US200642030, mailed Dec. 4, 2007, 4 pages.

*Primary Examiner* — William Deane, Jr.
(74) *Attorney, Agent, or Firm* — Toler Law Group, PC

(57) ABSTRACT

A method and/or apparatus of a voice-response directory assistance system having a targeted advertising engine is disclosed. In one embodiment, a method of a directory assistance system includes providing a greeting to a user of a mobile communication device, automatically determining a location based information of the user, determining a telephone number of a listing requested by the user, providing a targeted advertisement to the user based on the location information, and communicating the telephone number to the user. The method may include requesting a selection of a business listing and a residential listing through the greeting. The method may include processing a caller identification data to determine the location based information of the user, applying the caller identification data to a library of potential advertisements and selecting the potential advertisement as the targeted advertisement through applying the caller identification data to the library of potential advertisements.

19 Claims, 16 Drawing Sheets

(56) References Cited

U.S. PATENT DOCUMENTS

| | | | |
|---|---|---|---|
| 2004/0023644 A1* | 2/2004 | Montemer | 455/414.1 |
| 2005/0129208 A1* | 6/2005 | McGrath et al. | 379/218.01 |
| 2005/0245241 A1* | 11/2005 | Durand et al. | 455/414.1 |
| 2007/0127650 A1* | 6/2007 | Altberg et al. | 379/114.13 |
| 2007/0130014 A1* | 6/2007 | Altberg et al. | 705/14 |
| 2007/0201677 A1* | 8/2007 | Bates et al. | 379/265.01 |
| 2008/0086375 A1* | 4/2008 | Steck et al. | 705/14 |
| 2008/0208675 A1* | 8/2008 | Wolmuth et al. | 705/10 |
| 2009/0168987 A1* | 7/2009 | Bookstaff et al. | 379/213.01 |
| 2012/0003998 A1* | 1/2012 | McGary | 455/466 |

* cited by examiner

| HOME | MY ACCOUNT |

HOME > CAMPAIGN OVERVIEW

CAMPAIGN NAME :   CAMPAIGN NAME 1
CAMPAIGN GROUP :   CAMPAIGN GROUP 1     AD TYPE :     BRAND AD
CAMPAIGN START DATE : MONDAY, MARCH 05, 2006   CAMPAIGN END DATE : SUNDAY, MARCH 04, 2007
MONTHLY BUDGET :     $ 1000.00

TARGETING

DAYS OF THE WEEK
- ☐ MONDAY
- ☒ TUESDAY
- ☐ WEDNESDAY
- ☐ THURSDAY
- ☒ FRIDAY
- ☐ SATURDAY
- ☐ SUNDAY

☒ DO NOT DISPLAY BETWEEN [5:00 PM] AND [8:00 PM]   ~902

GEO-TARGETTING

☒ NATIONWIDE U.S.
☐ AREA CODES                                            ~904

TARGET ON

| | SELECTED | AREA CODE LIST |
|---|---|---|
| ☒ SELECTED AREA CODES | 650 – PALO ALTO, CA | 510 – BERKELEY, CA |
| ☐ ACCEPT ANY AREA CODE | | 631 – SALINAS, CA |
| ☐ AREA CODE OF CALLER | | ........ |
| ☐ AREA CODE OF REQUESTED LISTING | | |
| ☐ EITHER CALLER OR REQUESTED LISTING AREA CODE | | |

BUSINESS CATEGORY TARGETING

MAIN CATEGORY TO TARGET :   [RESTAURANTS ▽]        ~906

SUB – CATEGORIES TO TARGET :   [RESTAURANTS – PIZZA
RESTAURANTS – ITALIAN FOOD]

ADSPOT

ADSPOT A  ■ ▶   [THIS MONTH AT ..............................]    ~908
ADSPOT B  ■ ▶   [TWO FOR ONE PIZZA AND GARLIC BREAD ............]

CONVERSIONS

☒ CONVERSION AD [CONNECT TO YOUR NUMBER]       ~910
CONNECT NUMBER :  [(671)-555-5555]

FIGURE 9     CAMPAIGN VIEW 950

| | MONTHLY BUDGET | PLAYS | AD TYPE | CONVERSION | STATUS | COST | | |
|---|---|---|---|---|---|---|---|---|
| HOME | MY ACCOUNT | | | | | | | |
| ⊞ CAMPAIGN GROUP 1 | $ 2500.00 | 100 | | 8 | | $ 300.00 | | |
| ⊞ CAMPAIGN 1 | $ 1000.00 | 50 | BRAND AD | 0 | ACTIVE | $ 200.00 | COPY | STOP |
| ↳ ADSPOT A | | 25 | | 0 | ACTIVE | $ 100.00 | | |
| ↳ ADSPOT B | | 25 | | 0 | ACTIVE | $ 100.00 | | |
| ⊞ CAMPAIGN 2 | $ 1500.00 | 50 | CONVERSION AD | 8 | INACTIVE | $ 100.00 | COPY | STOP |
| ⊞ CAMPAIGN GROUP 2 | $ 500.00 | 100 | | 0 | | $ 100.00 | | |
| TOTAL | $ 3000.00 | 200 | | 8 | | $ 400.00 | | |
| ADD A NEW CAMPAIGN | | | | | | | | |

BUDGET INTERFACE 1050

STEP 1 : CAMPAIGN > STEP 2 : TARGETING > STEP 3 : ADSPOT > STEP 4 : CONVERSION > STEP 5 : REVIEW AND SUBMIT

CONVERSIONS

☐ CONVERSION AD [CONNECT TO YOUR NUMBER]
  CONNECT NUMBER : _____

☐ SMS TEXT MESSAGE [OPTION TO SEND A MESSAGE TO SMS ENABLED PHONE]
  MESSAGE TEXT : _____
  STATUS : PENDING CONTENT

☐ EXTENDED AUDIO [OPTION TO HEAR AN EXTENDED AUDIO MESSAGE
  AUDIO LOCATION : [ SELECT CREATIVE ]
  STATUS : PENDING EDITORIAL REVIEW

[ PREVIOUS SETUP ]   [ NEXT STEP ]

CONVERSION VIEW 1250

FIGURE 12

METHOD AND APPARATUS OF A VOICE-RESPONSE DIRECTORY ASSISTANCE SYSTEM HAVING A TARGETED ADVERTISING ENGINE

CLAIM OF PRIORITY

This patent application claims priority from U.S. Provisional patent application No. 60/731,330, titled 'Method and System for Enhanced Directory Assistance' filed on Oct. 28, 2005.

FIELD OF TECHNOLOGY

This disclosure relates generally to the technical fields of communications and, in one example embodiment, to a method and apparatus of a voice-response directory assistance system having a targeted advertising engine.

BACKGROUND

A directory assistance system may share information (e.g., residential listing information and/or commercial listing information) with a user (e.g., caller). The directory assistance system may operate through a voice response of the user to a prompt of the directory assistance system (e.g., responds to a human voice of the user). To gain access to the information, the user may need to pay a fee for access (e.g., $1.25).

In addition, an entity (e.g., a large company, a VoIP provider, a phone company, etc.) may offer the directory assistance system as a service to their constituents (e.g., employees, users, customers, etc.) for free. However, the entity may need to pay a provider of the directory assistance system a fee for each constituent routed to the directory assistance system. The fee may be expensive, because the entity may need to pay thousands of dollars a month to the provider (e.g., Tell Me® Business Search, OnStar®, etc.). The entity may not be able to profitably operate because the fee may exceed revenues. As such, the entity may incur significant business expense in maintaining the directory assistance system.

Furthermore, if the entity is the phone company (e.g., Sprint®, AT&T®, etc.), the entity may have a collection of unused numbers (e.g., an unassigned number, a disconnected number, etc.). A message indicating that the disconnected number (e.g., a previously assigned but now abandoned number) is no longer in service may be played on messages that are unused in compliance with a governmental regulation (e.g., a Federal Communications Commission rule, a federal law, a state law, etc.). An assignee may no longer pay the phone company to use the disconnected number. Playing the message indicating that the disconnected number is no longer in service may be expensive for the phone company when played on millions of disconnected numbers because there may be no way of charging the assignee for use of the disconnected number.

SUMMARY

A method, and/or apparatus of a voice-response directory assistance system having a targeted advertising engine is disclosed. In one aspect, a method of a directory assistance system includes providing a greeting to a user of a mobile communication device, automatically determining a location based information (e.g., the location based information may include a region of the user, a state of the user, a country of the user, an identifier number of the user, and/or a physical location of the user) of the user, determining a telephone number of a listing requested by the user, providing a targeted advertisement to the user based on the location information and communicating the telephone number to the user. The method may also include requesting a selection of one of a business listing and a residential listing through the greeting.

In addition, the method may include processing a caller identification data to determine the location based information of the user, applying the caller identification data to a library of potential advertisements and selecting at least one of the potential advertisements as a targeted advertisement through applying of the caller identification data to the library of potential advertisements. The method may include providing a Simple Text Message (SMS) having the telephone number to the user through a joint approval prompt provided to the user when determining the telephone number requested by the user.

Similarly, the method may include providing an advertisement of a related entity to the Simple Text Message along with the telephone number, and wherein the advertisement includes a trackable revenue generating number that is any one of a toll free number and a local number directly in an Simple Text Message body. The method may include determining the physical location of the user through a geographic positioning data provided by the user to the directory assistance system. A non-targeted advertisement (e.g., the non-targeted advertisement may be a first of a series of advertisements sharing a common auditory nexus that may be played to the user prior to communicating the telephone number to the user) may be played to the user after providing the greeting to the user of the mobile communication device.

The method may include providing a confirmatory message in between the first of the series of advertisements and other advertisements to provide a more relevant experience to the user. Also, the method may include processing a placement premium paid by an advertiser of the non-targeted advertisement when the non-targeted advertisement may be the first of the series of advertisements sharing the common auditory nexus. The confirmatory message may be provided by a human operator, and at most five advertisements may be provided to the user in a session between the user and the directory assistance system.

Moreover, the method may include connecting a call between the user and a business entity using the telephone number when the listing may be associated with the business entity rather than the residential listing. The method may further include providing a selection mechanism to the user indicating whether the user is to be connected to one of a business entity associated with the targeted advertisement and a requested entity associated with the listing, wherein the selection mechanism provides a priority to the business entity associated with the targeted advertisement over the requested entity associated with the listing.

In addition, the method may include providing an opt-out capability to an owner of the directory assistance system of specific types of the targeted advertisements not desirable to the owner of the directory assistance system (e.g., the directory assistance system may be instantiated through an indicator provided on a website, and the directory assistance system may provide an advertising revenue split with the owner of the directory assistance system when the user responds to the targeted advertisement.

Furthermore, the directory assistance system may be associated with unused telephone numbers that may be disconnected telephone numbers and/or unassigned telephone numbers, and may follow a disconnect message provided to the user when dialing the disconnected number, and the targeted advertisement may be based on an identity of a previous owner of the disconnected number.

In another aspect, a method of a directory assistance system includes determining that a user request is associated with a category search, searching a meta-data associated with each advertiser in an advertiser database to determine whether a particular advertiser may be associated with the category, and providing a targeted advertisement of the particular advertiser when the particular advertiser may be associated with a category, providing a non-targeted advertisement of the advertisement database when there are no advertisers associated with the category. The method may also include connecting the user to at least one of an entity associated with the targeted advertisement, the non-targeted advertisement, and/or a listing requested by the user.

In yet another aspect, a system includes a directory assistance system to provide a greeting to a user of a mobile communication device, to automatically determine a location based information of the user, to determine a telephone number (e.g., the directory assistance system may provide a Simple Text Message (SMS) having the telephone number to the user through a joint approval prompt provided to the user when determining the telephone number requested by the user) of a listing requested by the user, to provide a targeted advertisement to the user based on the location information, and to communicate the telephone number to the user and an advertiser of the targeted advertisement to provide a consideration to the directory assistance system when the user responds to the targeted advertisement.

In addition, the directory assistance system may be associated with unused telephone numbers that may be disconnected telephone numbers and unassigned telephone numbers, may follow a disconnect message provided to the user when dialing the disconnected number, and the targeted advertisement may be based on an identity of a previous owner of the disconnected number.

The methods, systems, and apparatuses disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 9 is a user interface view of a campaign view, according to one embodiment.

FIG. 10 is an interface view of a budget interface, according to one embodiment.

FIG. 11 is an interface view of an adspot view, according to one embodiment.

FIG. 12 is an interface view of an conversion view, according to one embodiment.

Figure 1:
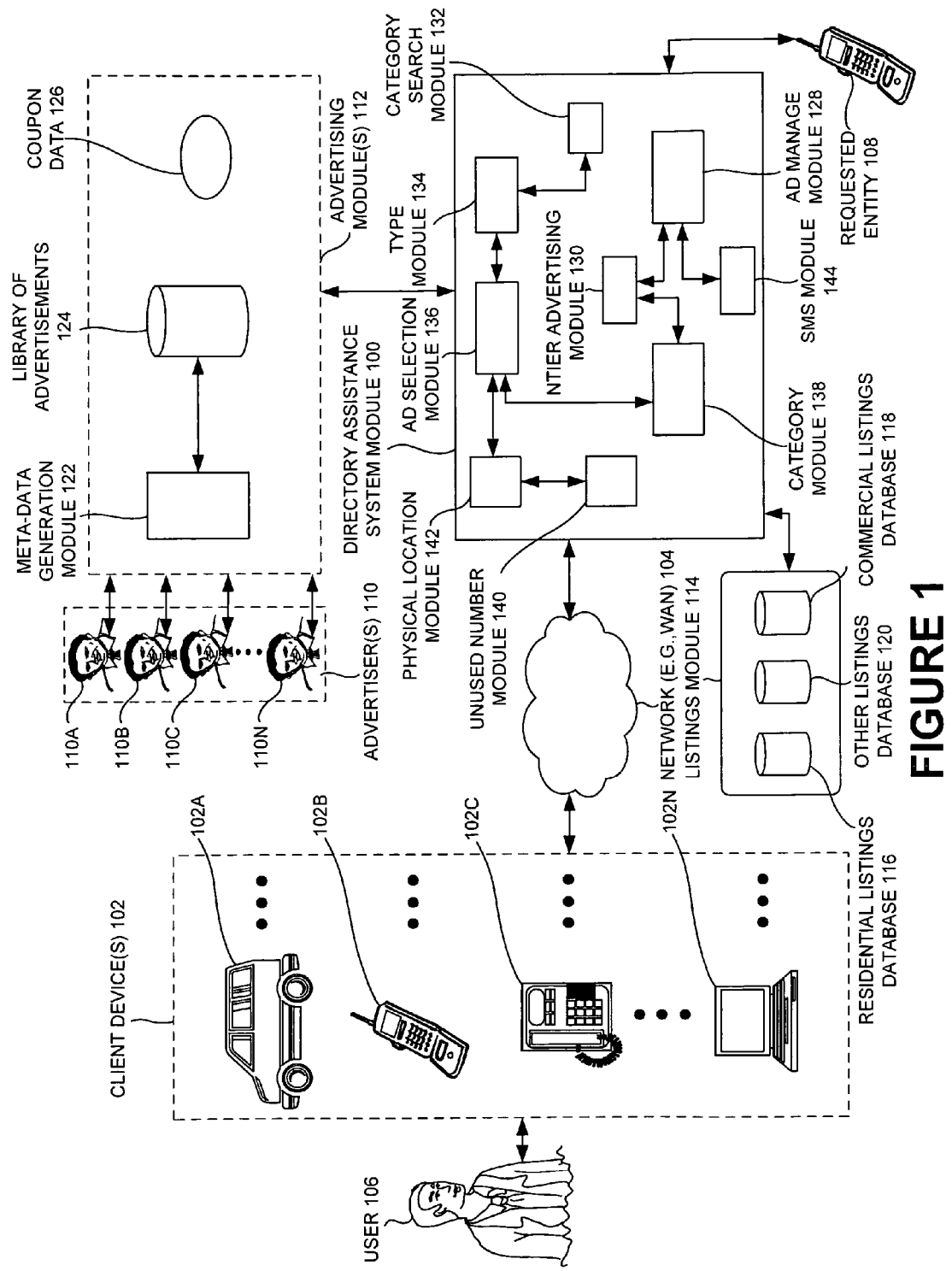
FIG. 1 is a system view of a directory assistance system module communicating with a client device(s) of a user through a network, according to one embodiment.

Other features of the present embodiments will be apparent from the accompanying drawings and from the detailed description that follows.

DETAILED DESCRIPTION

A method and/or apparatus of a voice-response directory assistance system having a targeted advertising engine is disclosed. In the following description, for the purposes of explanation, numerous specific details are set forth in order to provide a thorough understanding of the various embodiments. It will be evident, however to one skilled in the art that the various embodiments may be practiced without these specific details.

In one embodiment, a method of a directory assistance system includes providing a greeting to a user (e.g., the user 106 of FIG. 1) of a mobile communication device, automatically determining a location based information of the user (e.g., the user 106 of FIG. 1), determining a telephone number of a listing requested by the user (e.g., the user 106 of FIG. 1), providing a targeted advertisement to the user (e.g., the user 106 of FIG. 1) based on the location information and communicating the telephone number to the user.

In another embodiment, a method of a directory assistance system (e.g., the directory assistance system module 100 of FIG. 1) includes determining that a user (e.g., the user 106 of FIG. 1) request is associated with a category search (e.g., category module 138 of FIG. 1), searching a meta-data (e.g., the meta-data generation module 122 of FIG. 1) associated with each advertiser in an advertiser database to determine whether a particular advertiser is associated with the category, providing a targeted advertisement of the particular advertiser when the particular advertiser may be associated with the category, providing a non-targeted advertisement of the advertisement database (e.g., advertising module 112 of FIG. 1) when there may be no advertisers associated with the category.

In yet another embodiment, a system includes a directory assistance system may provide a greeting to a user (e.g., the user 106 of FIG. 1) of a mobile communication device, that may automatically determine a location based information of the user (e.g., the user 106 of FIG. 1), may determine a telephone number of a listing requested by the user, may provide a targeted advertisement to the user (e.g., the user 106 of FIG. 1) based on the location information, and may communicate the telephone number to the user and/or an advertiser of the targeted advertisement to provide a consideration to the directory assistance system (e.g., the directory assistance system module 100 of FIG. 1) when the user responds to the targeted advertisement.

FIG. 1 is a system view of a directory assistance system module 100 communicating with a client device(s) 102 of a user 106 through a network 104, according to one embodiment. Particularly, FIG. 1 illustrates a directory assistance system module 100, the client device(s) 102, the network 104, the user 106, a requested entity 108, an advertiser(s) 110, an advertising module 112, and a listings module 114, according to one embodiment.

For example, the directory assistance system module 100 may be a word recognition device, a phoneme recognition device, and an alphabet recognition device that may be used to find out a specific phone number and/or location (e.g., a region of the user, a state of the user, a country of the user, an identifier number of the user, and a physical location of the user, etc.) of a residence and/or business as requested by the user (e.g., the user 106 of FIG. 1) associated with mobile communication device.

The directory assistance system module 100 may contain an ad manage module 128, a ntier advertising module 130, a category search module 132, a type module 134, an ad selection module 136, a category module 138, a unused number module 140, a physical location module 142, SMS module 144. The ad manage module 128 may manage the targeted and/or non targeted advertisements that any be provided to the user when the user 106 responds through the directory assistance module (e.g., the directory assistance system module 100 of FIG. 1). The ad manage module 128 may play the advertisement to the user (e.g., the user 106 of FIG. 1) of the mobile communication device (e.g., the client device(s) 102 of FIG. 1) after providing the greeting. The ntier advertising module 130 may manage the advertisements to be played to the user requesting for the business and/or residential listings.

The category search module 132 may be associated with searching the particular advertiser of the targeted advertisements related to the particular category requested by the user (e.g., the user 106 of FIG. 1). The type module 134 may be associated with the type of the advertisement requested by the user (e.g., the user 106 of FIG. 1). The ad selection module 136 may be associated with selecting at least one of the potential advertisements as a targeted advertisement through applying the caller identification data to the library of potential advertisements.

The category module 138 may contain the information of the potential advertiser (e.g., an advertiser(s) 110 of FIG. 1) of the targeted and non-targeted advertisements. The unused number module 140 may be at least one of disconnected telephone numbers and unassigned telephone numbers and may provide a disconnect message provided to the user when dialing the disconnected number. The physical location module 142 may determine the physical location of the user (e.g., the user 106 of FIG. 1) through a geographic positioning data provided by the user 106 to the directory assistance system module 100.

The SMS module 144 may provide a Simple Text Message (SMS) having the telephone number to the user (e.g., the user 106 of FIG. 1) through a joint approval prompt provided to the user (e.g., the user 106 of FIG. 1) when determining the telephone number requested by the user (e.g., the user 106 of FIG. 1). The client device(s) 102 may be a communication medium (e.g., a computer connected to LAN/WAN, a television, a telephonic device, a cellular phone, etc) that may be used by the user 106 of FIG. 1 to request the directory assistance system module 100 to communicate the telephone numbers of the targeted and/or non-targeted advertisers (e.g., the advertiser(s) 110 of FIG. 1). The network 104 may be a network of telecommunications links arranged so that messages may be passed from user 106 to directory assistance system module 100 over multiple links.

The user 106 may be another entity (e.g., caller) that may employ the services provided by a directory assistance system module 100 requested by the user 106 with the help of client device(s) 102 connected through the network 104. The requested entity 108 may be an entity associated with the targeted advertisement, the non-targeted advertisement, and/or a listing requested for communication by the user (e.g., the user 106 of FIG. 1) to the directory assistance system module 100. The advertiser 110 may be associated with category having a meta-data loaded in the advertiser database (e.g., advertising module 112 of FIG. 1). The advertiser 110 may provide a consideration to the directory assistance system module 100 when the user 106 responds to the targeted advertisement.

The advertising module 112 may serve as a database that may contain the targeted advertisements of the advertisers 110 related to the particular category. The advertising module 112 may contain the meta-data generation module 122, library of advertisements 124, and coupon data 126. The meta-data generation module 122 may make the document related to the particular target advertisement easier to find out that a particular advertiser relates to the category. The library of advertisements 124 may contain the number of advertisement related to the advertisers 110 and be referred when the users (e.g., the user 106 of FIG. 1) requires the information on the targeted advertisements of the advertiser (e.g., the advertiser(s) 110 of FIG. 1) through the directory assistance system module 100. The coupon data 126 may be associated with providing an advertisement of a related entity to the Simple Text Message along with the telephone number, and wherein the advertisement includes a trackable revenue generating number that is any one of a toll free number and a local number directly in an Simple Text Message body (e.g., the user 106 of FIG. 1). The listings module 114 may communicate the listings of the telephone number requested by the user (e.g., the user 106 of FIG. 1) through the directory assistance system module 100.

The listings module 114 may contain a residential listings database 116, a commercial listings database 118 and other listings database 120. The residential listings database 116 may contain stored telephone numbers of the residential listings to be provided to the user (e.g., the user 106 of FIG. 1) as and when requested by the user (e.g., the user 106 of FIG. 1). The commercial listings database 118 may contain the telephone numbers associated with business entity that may be communicated to the user (e.g., the user 106 of FIG. 1) when requested. The other listings database 120 may include the information regarding the telephone numbers of the entity other then business and/or residential entity.

In the example embodiment illustrated in FIG. 1, the directory assistance system module 100 communicates with the client device(s) 102 through a network 104. Also the user 106 may communicate with directory assistance system module 100 using the client device(s) 102 according to example embodiments illustrated in FIG. 1. The requested entity 108 as illustrated in FIG. 1 directly communicates with the directory assistance system module 100. The advertiser(s) 110 may interact directly with the advertising module 112 as illustrated in example embodiments of FIG. 1. The advertising module 112 directly communicates with the directory assistance system module 100. In example embodiment illustrated in FIG. 1, the listings module 114 communicates with the directory assistance system module 100.

For example, a method of a directory assistance system (e.g., a directory assistance system module 100 of FIG. 1) includes providing a greeting to a user (e.g., the user 106 of FIG. 1) of a mobile communication device (e.g., a client device(s) 102 of FIG. 1). A location based information (e.g., the location based information includes at least of a region of the user (e.g., the user 106 of FIG. 1), a state of the user (e.g., the user 106 of FIG. 1), a country of the user (e.g., the user 106 of FIG. 1), an identifier number of the user (e.g., the user 106 of FIG. 1), and a physical location of the user (e.g., the user 106 of FIG. 1) of the user (e.g., the user 106 of FIG. 1) may be automatically determined. A telephone number of a listing requested by the user (e.g., the user 106 of FIG. 1) may be determined.

Also, a targeted advertisement (e.g., a targeted advertisement 204 of FIG. 2) to the user (e.g., the user 106 of FIG. 1) may be provided based on the location information. The telephone number may be communicated to the user (e.g., the user 106 of FIG. 1). The method may include a selection of one of a business listing and/or a residential listing (e.g., residential listings database 116 of FIG. 1) through the greeting. The method may include processing a caller identification data to determine the location based information of the user (e.g., the user 106 of FIG. 1). The caller identification data may be applied to a library of potential advertisements. The potential advertisements as the targeted advertisement (e.g., the targeted advertisement 204 of FIG. 2) through the applying of the caller identification data to the library of potential advertisements.

In addition, the method may include determining the physical location of the user (e.g., the user 106 of FIG. 1) through a geographic positioning data provided by the user (e.g., the user 106 of FIG. 1) to the directory assistance system (e.g., the directory assistance system module 100 of FIG. 1). The method may include providing an opt-out capability to an owner of the directory assistance system (e.g., the directory assistance system module 100 of FIG. 1) of specific types of the targeted advertisements (e.g., the targeted advertisement 204 of FIG. 2) not desirable to the owner of the directory assistance system (e.g., the directory assistance system module 100 of FIG. 1).

Furthermore, the directory assistance system (e.g., the directory assistance system module 100 of FIG. 1) may be associated with unused telephone numbers that may disconnected telephone numbers and unassigned telephone numbers, may follow a disconnect message provided to the user (e.g., the user 106 of FIG. 1) when dialing the disconnected number, and the targeted advertisement (e.g., the targeted advertisement 204 of FIG. 2) may be based on an identity of a previous owner of the disconnected number.

Moreover, the method of the directory assistance system (e.g., the directory assistance system module 100 of FIG. 1) includes determining that the user (e.g., the user 106 of FIG. 1) request is associated with a category search. A meta-data associated with each of an advertiser (e.g., an advertiser(s) 110 of FIG. 1) may be searched in the advertiser database to determine whether a particular advertiser (e.g., the advertiser(s) 110 of FIG. 1) is associated with the category. The targeted advertisement (e.g., the targeted advertisement 204 of FIG. 2) of the particular advertiser may be provided when the particular advertiser (e.g., the advertiser(s) 110 of FIG. 1) may be associated with a category. A non-targeted advertisement (e.g., non-targeted advertisement 202 of FIG. 2) of the advertisement database may be provided when there are no advertisers (e.g., the advertiser(s) 110 of FIG. 1) associated with the category.

Similarly, a system includes the directory assistance system (e.g., the directory assistance system module 100 of FIG. 1) to provide a greeting to the user (e.g., the user 106 of FIG. 1) of the mobile communication device (e.g., the client device(s) 102 of FIG. 1), to automatically determine a location based information of the user (e.g., the user 106 of FIG. 1), to determine a telephone number of a listing requested by the user (e.g., the user 106 of FIG. 1), to provide a targeted advertisement to the user (e.g., the user 106 of FIG. 1) based on the location information, and to communicate the telephone number to the user (e.g., the user 106 of FIG. 1). The advertiser (e.g., the advertiser(s) 110 of FIG. 1) of the targeted advertisement may provide a consideration to the directory assistance system (e.g., the directory assistance system module 100 of FIG. 1) when the user responds to the targeted advertisement.

Figure 2:
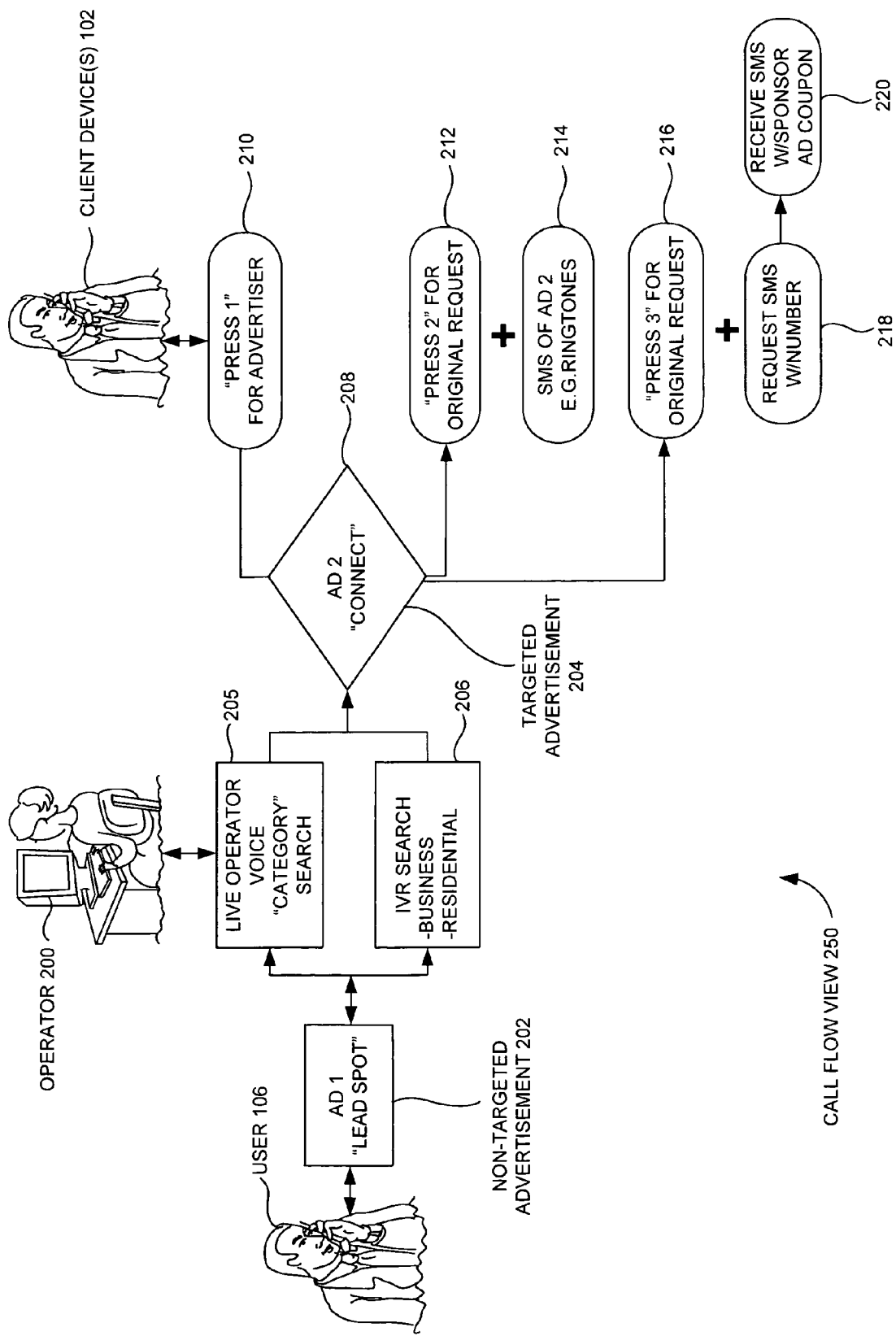
FIG. 2 is a process flow of the call flow, according to one embodiment.

FIG. 2 is a process view of a call flow for an advertisement, according to one embodiment. Particularly, FIG. 2 illustrates a user 106, a client device(s) 102, a non-targeted advertisement 202 and a targeted advertisement 204, according to one embodiment. The user 106 (e.g., caller) may be a consumer (e.g., a customer) availing the facility of directory assistance system (e.g., responds to a human voice of the user) on a mobile communication device. The client device(s) 102 may be promoter of any products, services, business and/or industry who may share information (e.g., residential listing information and/or commercial listing information) with a user 106 (e.g., caller). An operation 200 may operate to a voice response of the user to a prompt of the directory assistance system (e.g., responds to a human voice of the user). The non-targeted advertisement 202 may be ad, announcement, commercial, classified, public notice and/or a trailer that may not be a part of the assistance requested by the user (e.g., caller) and may be played to the user 106 after providing the greeting to the user of the mobile communication device.

The targeted advertisement 204 may be the information that may be requested by a user from the directory assistance system (e.g., responds to a human voice of the user) that may be based on the location information of the user 106. The operation 205 may be a live operator voice "category search" in which the user 106 (e.g., caller) may have requested some information that may belong to a certain category (e.g., list of hotels, list of vendors, list of malls, brokers, real estate, food etc.) from the directory assistance system (e.g., responds to a human voice of the user). In operation 206 may be a IVR (Integrated Voice Representation) search that may relate to business and/or residential information from the directory assistance system (e.g., responds to a human voice of the user).

The operation 208 may be an ad 2 "connect" operation. The operation 210 may be an operation to get connected to the ad that may be provided by the advertiser(s). The operation 212 may be original request option which may help the user 106(e.g., caller) to return back to the original listings. The operation 214 may be SMS of ad 2, which may send ad in form of text to the user 106(e.g., caller) of the directory assistance system (e.g., responds to a human voice of the user).

For example, the method may include providing a Simple Text Message (SMS) having the telephone number to the user (e.g., the user 106 of FIG. 1) through a joint approval prompt provided to the user (e.g., the user 106 of FIG. 1) when determining the telephone number requested by the user (e.g., the user of FIG. 1). A non-targeted advertisement (e.g., the non-targeted advertisement may be a first of a series of advertisements sharing a common auditory nexus that may be played to the user prior to communicating the telephone number to the user) may be played to the user after providing the greeting to the user (e.g., the user 106 of FIG. 1) of the mobile communication device (e.g., the client device(s) 102 of FIG. 1).

In addition, the method may include processing a placement premium paid by the advertiser (e.g., the advertiser(s) 110 of FIG. 1) of the non-targeted advertisement when the non-targeted advertisement may be the first of the series of advertisements sharing the common auditory nexus. The method the confirmatory message may be provided by a human operator, and at most five advertisements may be provided to the user (e.g., the user 106 of FIG. 1) in a session between the user (e.g., the user 106 of FIG. 1) and the directory assistance system (e.g., the directory assistance system module 100 of FIG. 1).

Also, the method may include connecting the user (e.g., the user 106 of FIG. 1) to an entity associated with the targeted advertisement, the non-targeted advertisement, and/or a listing requested by the user (e.g., the user 106 of FIG. 1). The directory assistance system (e.g., the directory assistance system module 100 of FIG. 1) may also provide a Simple Text Message (SMS) having the telephone number to the user through a joint approval prompt provided to the user (e.g., the user 106 of FIG. 1) when determining the telephone number requested by the user (e.g., the user 106 of FIG. 1).

Figure 3:
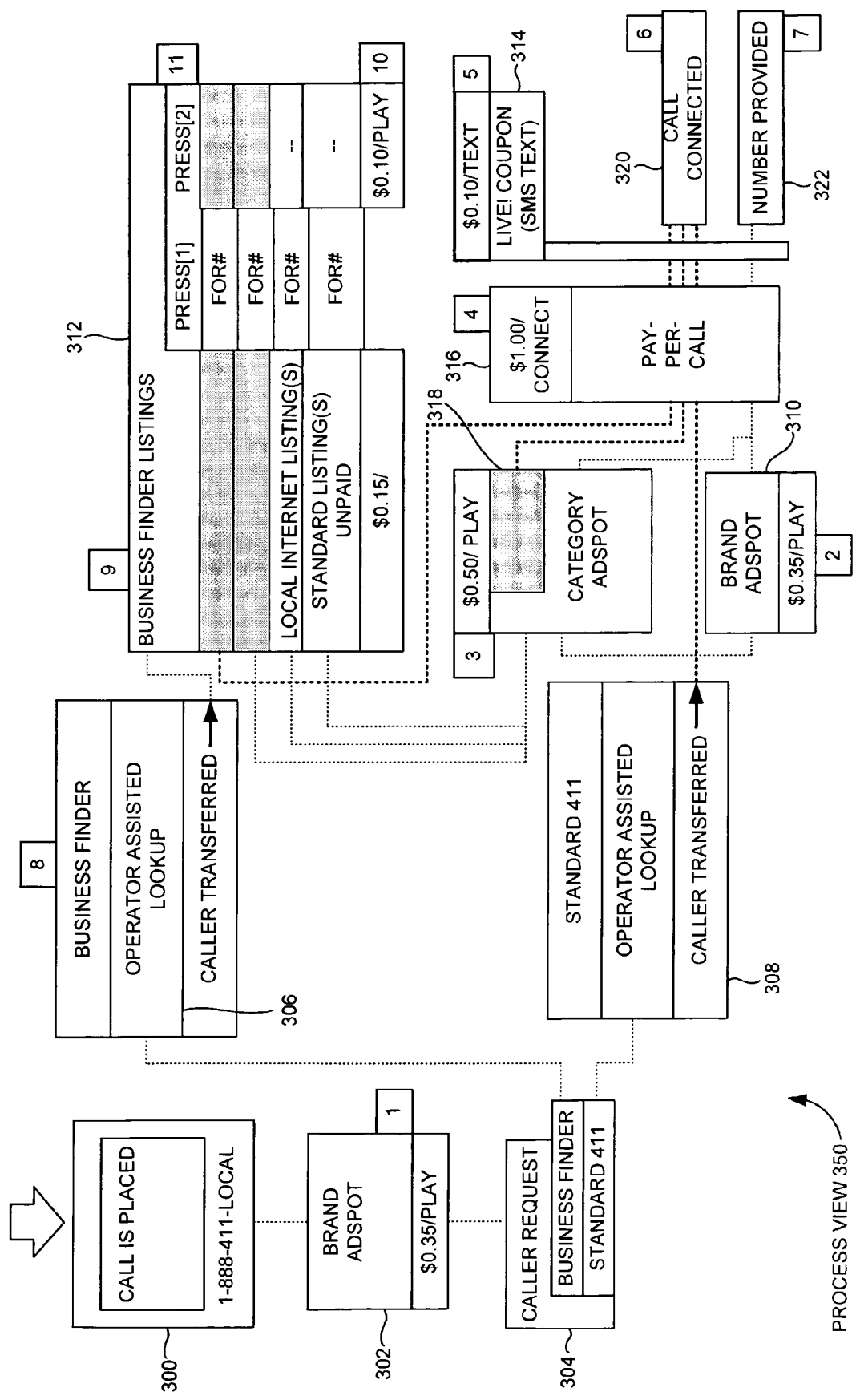
FIG. 3 is a view diagram of a process view of an exemplary call flow, according to one embodiment.

FIG. 3 is a view diagram of a process view of an exemplary call flow, according to one embodiment. In operation 300, the system identifies the incoming call and may also identify the caller id, landline or cell phone, caller location and/or may recognize the caller (e.g., if they have called before). The system may also welcome the caller. The information the collected may be stored in the database and may be used during the entire process of communication. In operation 302, the brand adspot may be played to the user @ $0.35/play. In operation 304, the caller may request the system to transfer the call to either business finder or standard 411. In operation 306, the call may be forwarded to the operator assisted lookup of business finder if the caller wants to know the business finder listing.

In operation 308, the call may be forwarded to the standard 411 operated assisted lookup and the call may be transferred. In operation 310, brand adspot may be played to the user @ $0.35/play for the user requesting to transfer the call to standard 411. In operation 312, caller may be transferred to the business finder listings where system offers options for the caller such as local internet listing(s), standard listing(s) unpaid etc. In operation 314, system may send the SMS to the caller on the caller's number identified earlier @ $0.10/text.

In operation 316, caller may be connected to the required listings @ $1.00/connect. In operation 318, the category adspot may be played on request of the user @ $0.50/play. In operation 320, the system may connect the caller to one of the listing requested by the caller. In operation 322, the system may provide the number to the caller of the requested entity.

For example, the method may include providing an advertisement of a related entity to the Simple Text Message along with the telephone number, and wherein the advertisement includes a trackable revenue generating number that is any one of a toll free number and a local number directly in an Simple Text Message body. The method may include providing a confirmatory message in between the first of the series of advertisements and other advertisements to provide a more relevant experience to the user (e.g., the user 106 of FIG. 1).

Furthermore, the method may include connecting a call between the user (e.g., the user 106 of FIG. 1) and a business entity using the telephone number when the listing may be associated with the business entity rather than the residential listing (e.g., residential listings database 116 of FIG. 1). The method may include providing a selection mechanism to the user (e.g., the user 106 of FIG. 1) indicating whether the user (e.g., the user 106 of FIG. 1) is to be connected to one of a business entity associated with the targeted advertisement (e.g., the targeted advertisement 204 of FIG. 2) and a requested entity associated with the listing, wherein the selection mechanism provides a priority to the business entity associated with the targeted advertisement (e.g., the targeted advertisement 204 of FIG. 2) over the requested entity associated with the listing.

In addition, the directory assistance system (e.g., the directory assistance system module 100 of FIG. 1) may be instantiated through an indicator provided on a website, and may provide an advertising revenue split with the owner of the directory assistance system (e.g., the directory assistance system module 100 of FIG. 1) when the user (e.g., the user 106 of FIG. 1) responds to the targeted advertisement (e.g., the targeted advertisement 204 of FIG. 2).

Figure 4:
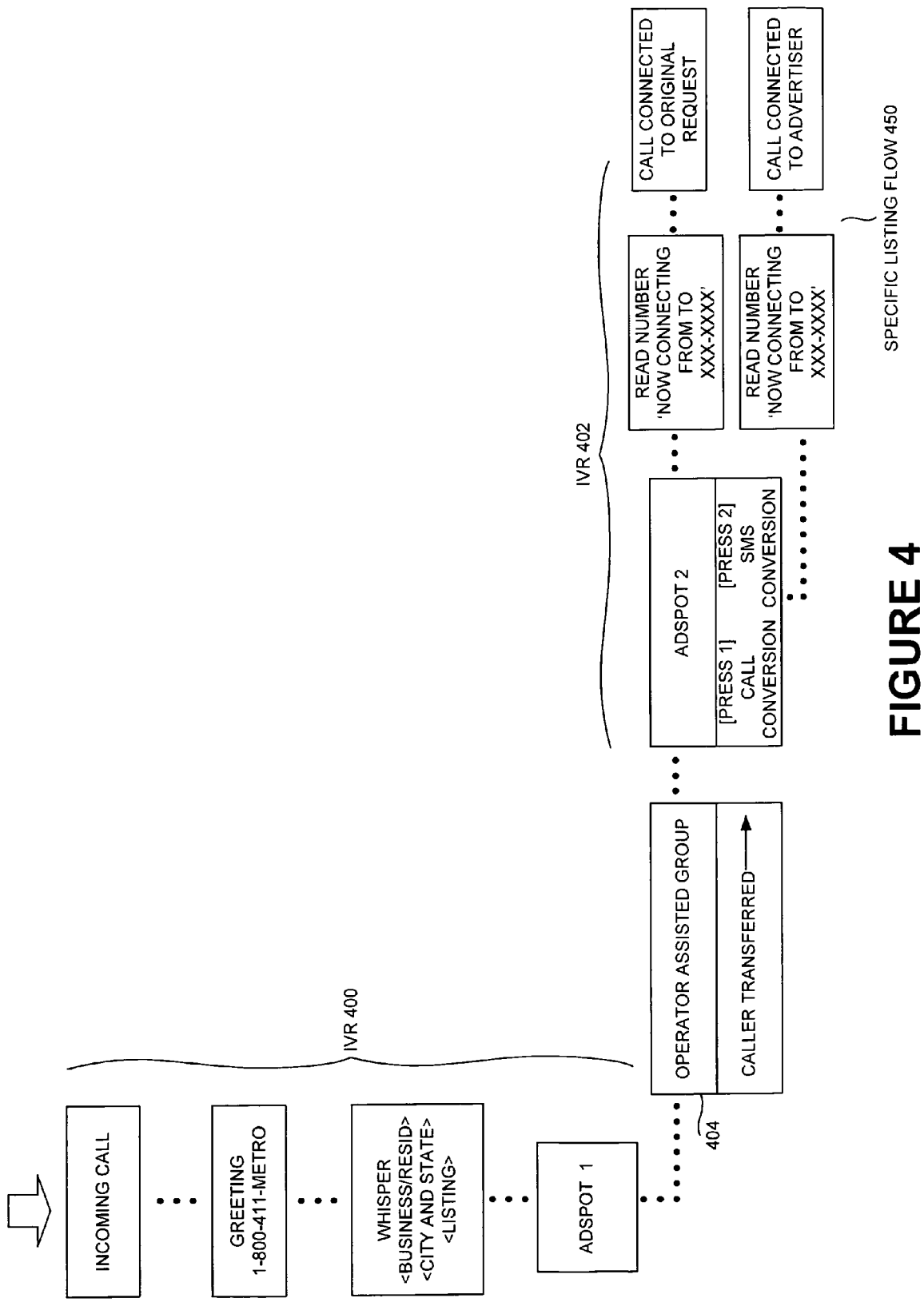
FIG. 4 is a flow diagram of a specific listing flow, according to one embodiment.

FIG. 4 is a flow diagram of a specific listing flow, according to one embodiment. Particularly, FIG. 4 illustrates an IVR (Integrated Voice Response) 400, an IVR (Integrated Voice Response) 402 and an operator assisted lookup 404 according to one embodiment. The IVR (Integrated Voice Response) 400 may include incoming call, greeting, whisper and/or adspot. Incoming calls may be the calls made by the user of the mobile communication device. Whisper may be the location based information that may include region of the user, a state of the user, a country of the user, an identifier number of the user, and/or a physical location of the user.

The operator assisted lookup 404 may be an operator and/or an electronic medium that may be connecting a call between the user and the advertiser. The IVR (Integrated Voice Response) 402 may include the process of connecting a user of directory assistance system, to an advertiser and/or returning back to an original request.

Figure 5:
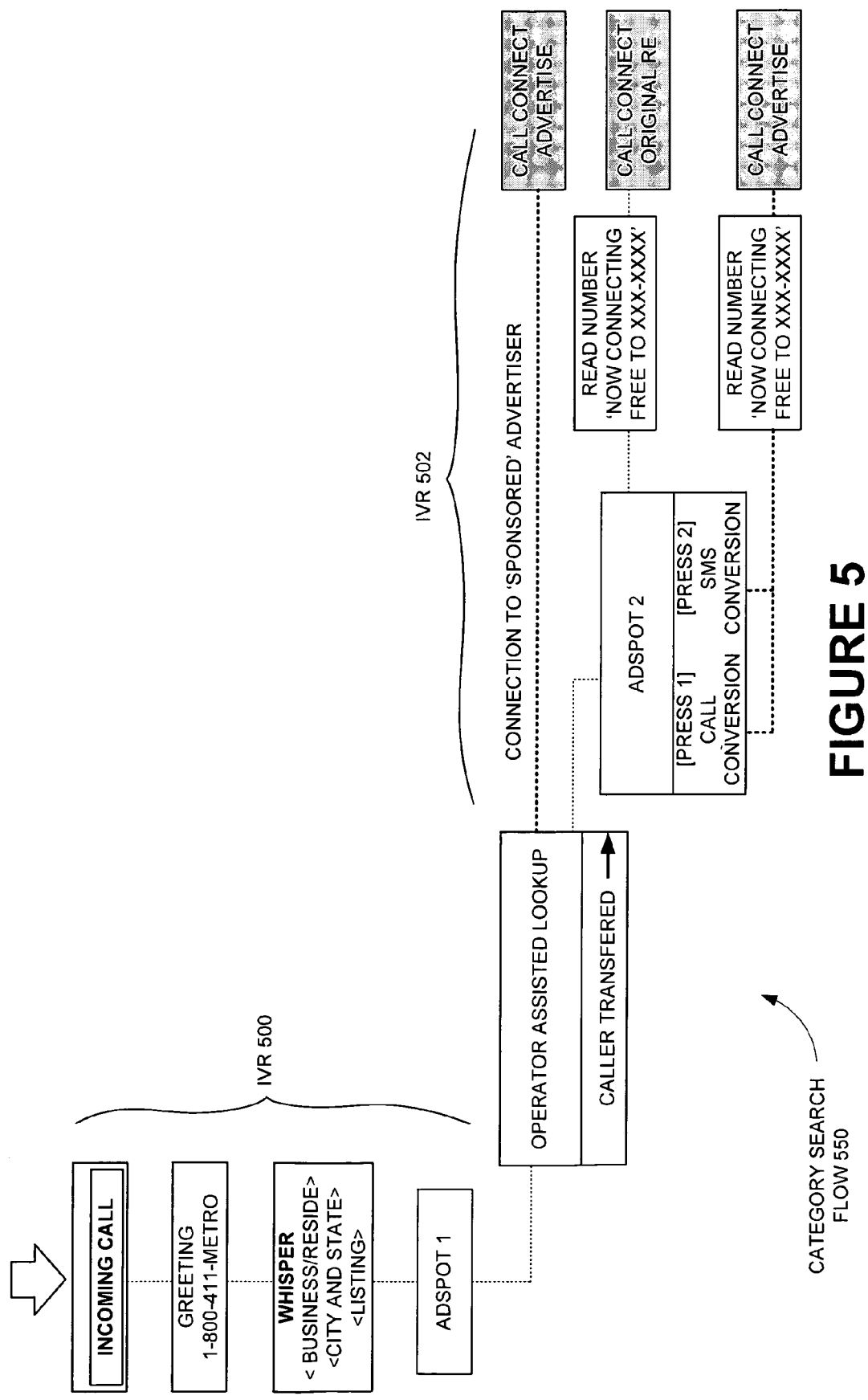
FIG. 5 is a flow diagram of category search flow, according to one embodiment.

FIG. 5 is a flow diagram of category search flow, according to one embodiment. Particularly, FIG. 5 illustrates an IVR (Integrated Voice Response) 400 and an IVR (Integrated Voice Response) 500 according to one embodiment. The IVR (Integrated Voice Response) 500 may include incoming call, greeting, whisper and/or adspot. Incoming calls may be the calls made by the user of the mobile communication device. Whisper may be the location based information that may include region of the user, a state of the user, a country of the user, an identifier number of the user, and a physical location of the user. The operator assisted lookup may be an operator and/or an electronic medium that may connect a call between the user and the advertiser.

The IVR (Integrated Voice Response) 502 may include the process of connecting a user of directory assistance system, to an advertiser and/or returning back to an original request. The call of the user may be directly connected to the sponsored advertiser by the operator assisted lookup. The IVR (Integrated Voice Response) 502 may include the process of connecting a user of directory assistance system (e.g., responds to a human voice of the user), to an advertiser and/or returning back to an original request.

Figure 6:
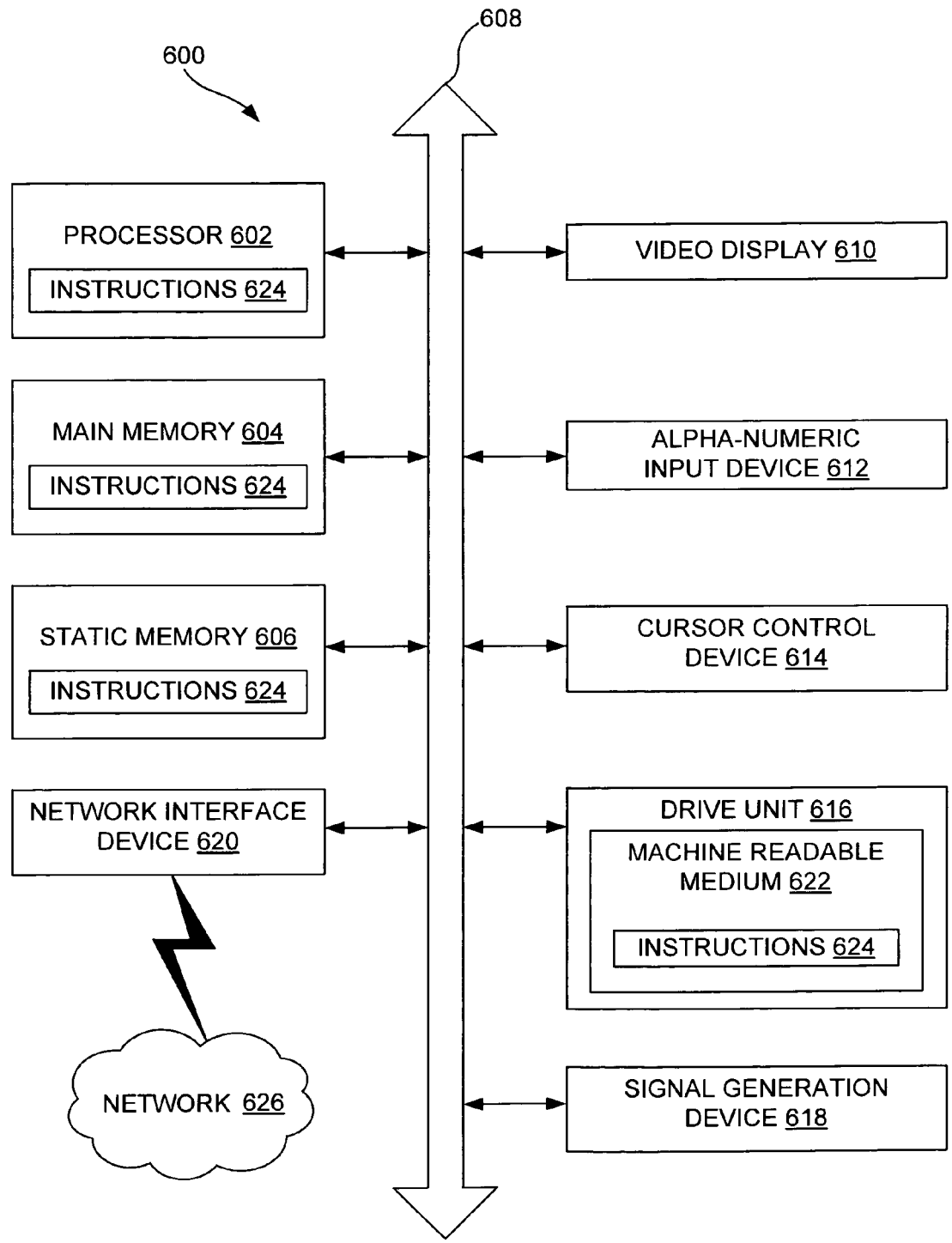
FIG. 6 is a diagrammatic representation of a data processing system capable of processing a set of instructions to perform any one or more of the methodologies herein, according to one embodiment.

FIG. 6 is a diagrammatic system view 600 of a data processing system in which any of the embodiments disclosed herein may be performed, according to one embodiment. Particularly, the system view 600 of FIG. 6 illustrates a processor 602, a main memory 604, a static memory 606, a bus 608, a video display 610, an alpha-numeric input device 612, a cursor control device 614, a drive unit 616, a signal generation device 618, a machine readable medium 622, instructions 624, and a network 626, according to one embodiment. The diagrammatic system view 600 may indicate a personal computer and/or a data processing system in which one or more operations disclosed herein are performed.

The processor 602 may be microprocessor, a state machine, an application specific integrated circuit, a field programmable gate array, etc. (e.g., Intel® Pentium® processor). The main memory 604 may be a dynamic random access memory and/or a primary memory of a computer system. The static memory 606 may be a hard drive, a flash drive, and/or other memory information associated with the data processing system. The bus 608 may be an interconnection between various circuits and/or structures of the data processing system. The video display 610 may provide graphical representation of information on the data processing system. The alpha-numeric input device 612 may be a keypad, keyboard and/or any other input device of text (e.g., a special device to aid the physically handicapped). The cursor control device 614 may be a pointing device such as a mouse.

The drive unit 616 may be a hard drive, a storage system, and/or other longer term storage subsystem. The signal generation device 618 may be a bios and/or a functional operating system of the data processing system. The machine readable medium 622 may provide instructions on which any of the methods disclosed herein may be performed. The instructions 624 may provide source code and/or data code to the processor 602 to enable any one/or more operations disclosed herein.

Figure 7:
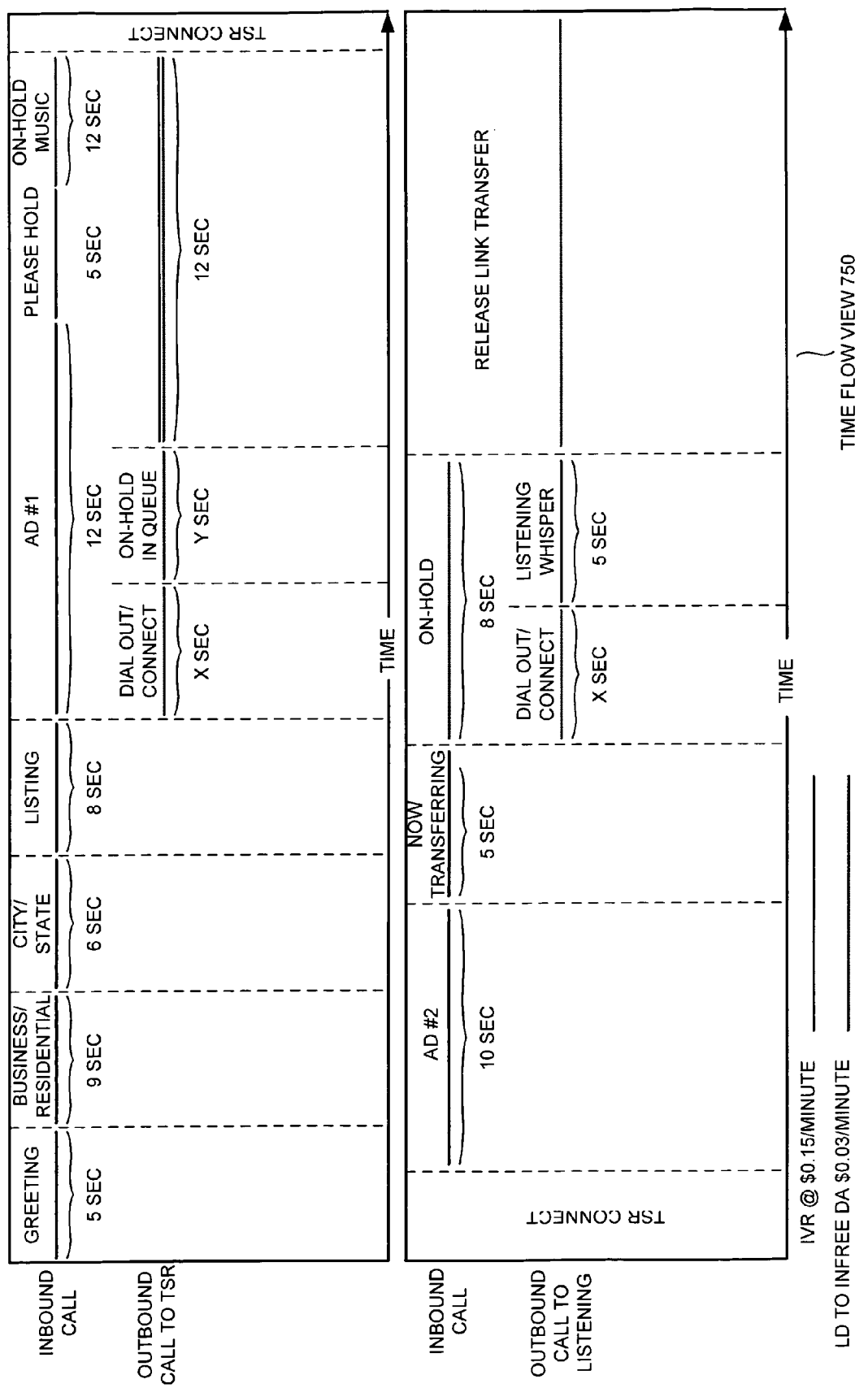
FIG. 7 is a time diagram of time flow view, according to one embodiment.

FIG. 7 is a time diagram of time flow view, according to one embodiment. Particularly FIG. 7 illustrates the distribution of time for the inbound call and the outbound call to TSR. The total time to an inbound call may be distributed to various sections and that may include greeting, business/residential, city/state, listings, ad 1, on hold, on-hold music, ad 2, call transferring and on hold. The total time for the outbound may be distributed in dial out/connect, on-hold in queue, agent whisper, listing whisper etc. The greeting may be the welcome note to the user (e.g., caller) and the time allotted for greeting may be 5 sec.

A residential listing information and/or business listing information may be the information shared by directory assistance system and may take 9 sec for the inbound call. The city/state may be the location based information (e.g., location based information includes at least of a region of the user, a state of the user, a country of the user, an identifier number of the user, and a physical location of the user) of the user and may take 8 sec and listing may take 8 sec. The ad #1 may be allotted 12 sec and later the caller may be on hold for 5 sec. The on hold music may continue for 12 sec. In the outbound call to TSR the dial out/connect may take X sec and on-hold in queue may continue for Y sec. The ad #2 may be played for 10 sec followed by now transferring the call request by 5 sec. again the on-hold music may continue last for 8 sec and finally the release link is transferred. In the outbound call to listening the dial out/connect may take X sec and listening whisper may continue for 5 sec. The IVR may be charged @ 0.15/minute, LD to INFREEDA may be charged @ 0.03/minute and LD to NUCOMM may be charged @ 0.03/minute.

Figure 8:
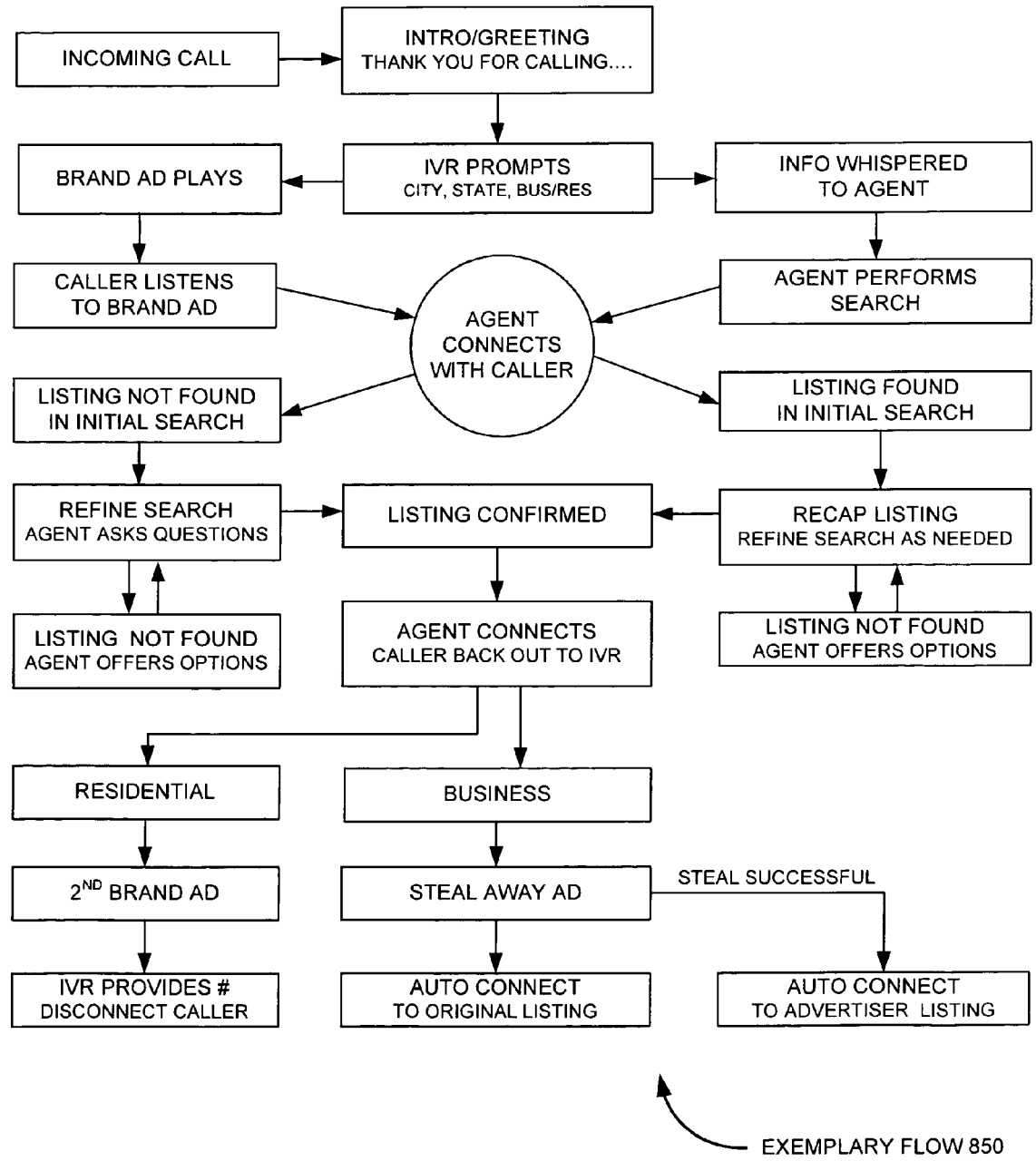
FIG. 8 is a flow diagram of exemplary flow, according to one embodiment.

FIG. 8 is a flow diagram of exemplary flow 850, according to one embodiment. In the example embodiments illustrated in FIG. 8, the user (e.g., the user 106 of FIG. 1) may call the directory assistance system (e.g., the directory assistance system module 100 of FIG. 1) through the client devices (e.g., the client device(s) 102 of FIG. 1) to get connected to the required entity (e.g., residential listing, business listing, advertiser listing, etc). The automated directory assistance system (e.g., the directory assistance system module 100 of FIG. 1) receives the incoming call from the user (e.g., the user 106 of FIG. 1) and may play pre-recorded introduction and/or greeting to the user (e.g., the user 106 of FIG. 1) of the mobile communication device (e.g., the client device(s) 102 of FIG. 1). Then the IVR (e.g., the IVR 400 of FIG. 4) may play a pre-recorded voice prompts to which the user (e.g., the user 106 of FIG. 1) may respond to the information such as city, state, business and/or residential etc.

Then the directory assistance system (e.g., the directory assistance system module 100 of FIG. 1) may play a brand ad on the communicating device of the user (e.g., the user 106 of FIG. 1), which is listened by the user (e.g., the user 106 of FIG. 1) until connected by the agent. At the same instance, the IVR (e.g., the IVR 400 of FIG. 4) may whisper (e.g., speak) the information to the agent. The agent after receiving the information about the caller may perform the related search and may connect the caller. If the agent doesn't find the listings requested by the user (e.g., the user 106 of FIG. 1) then the agent may recap the listings. If the listings are still not found then the agent may go for refining the search and/or may also ask more question while refining the search and may also offer more options in the process of refining the search of the listings specified by the user. Once the listing is confirmed, the agent may connect caller back to the IVR (e.g., the IVR 400 of FIG. 4).

The listing confirmed by the agent may be the residential listing and/or business listing. If the user (e.g., the user 106 of FIG. 1) prefers residential listing then the directory assistance system (e.g., the directory assistance system module 100 of FIG. 1), may play the $2_{nd}$ brand ad until the IVR (e.g., the IVR 400 of FIG. 4) searches and provides the telephone number requested by the user (e.g., the user 106 of FIG. 1) and further disconnect the call from the user (e.g., the user 106 of FIG. 1). If the user (e.g., the user 106 of FIG. 1) prefers business listing, a steal away ad (e.g., an advertisement that diverts the user to another company which pays the directory assistance provider) may be played and if the steal is successful, then the caller may be directly connected to the advertiser listing and if the steal is unsuccessful, the caller may be connected directly to the original listing.

FIG. 9 is a user interface view of a campaign view 950, according to one embodiment. The campaign view 950 may be associated with the campaign name, campaign group, campaign start and end date, monthly budget of the campaign, and the ad type. The view 902 may be associated with the targeting of the campaign of the particular ad type. The view 904 may be associated with geo-targeting that contain information of the physical location of the user. The view 906 may be associated with the business category targeting that may include the main category and the sub-category to be targeted. The view 908 may provide the information on the adspot and may play the audio files displayed. The view 910 may be associated with the conversion ad that may allow to add a number to be called into the listing.

In the example embodiment illustrated in FIG. 9, the campaign view 950 may display campaign name as "campaign name 1", campaign group "campaign group", campaign start date "Monday, Mar. 05, 2006", Campaign end date "Sunday, Mar. 04, 2007, Monthly Budget "$1 000.00". The view 902 may display the day and date of targeting. The view 904 may display geo-targeting view and target on that may contain the selected area code and area code list. The view 906 may be associated with business category targeting which may display the main category type and the sub category to target. The view 908 may be associated with the adspot view that may display the adspot A, adspot B and may also contain the audio files. The view 910 may be associated with the conversion ad that may facilitate to type the number to be connected.

FIG. 10 is an interface view of a budget interface 1050, according to one embodiment. For example, the Budget interface 1050 displays the campaign reporting. The interface view may display the hyperlinks to facilitate the user (e.g., the user 106 of FIG. 1) view campaign summary screen. The budget interface view 1050 may also display a monthly budget, the number of plays, an ad type, times of conversion, status of the campaign (e.g., active, inactive), cost incurred with reference to each campaign and its sub elements. The copy option may facilitate the campaign builder operations. The add a new campaign option may allow the user (e.g., the user 106 of FIG. 1) to add the new campaign into the budget interface view 1050. The stop option may allow the user (e.g., the user 106 of FIG. 1) to deactivate the campaign after some method of confirmation.

In the example embodiment illustrated in FIG. 10, the budget interface 1050 may displays campaign Group 1 for which monthly budget is displayed as "$2500.00", Plays "100", ad type "brand ad", conversion "8", status "active", cost "$300" in the first row of the budget interface 1050 of FIG. 10. The Campaign group 1 may contain links as "campaign 1" and "campaign 2". Similarly the budget interface 1050 may displays campaign group 2 for which monthly budget is displayed as "$500.00", Plays "100", ad type "brand ad", conversion "0", status "–", cost "$100" in the second last row of the budget interface 1050 of FIG. 10. The last row of the budget interface 1050 may display total for the campaign group 1 and campaign group 2. The total for the monthly budget, plays, conversion, and cost is displayed as "$3000.00", "200", "8", "$400" respectively.

Figure 11:
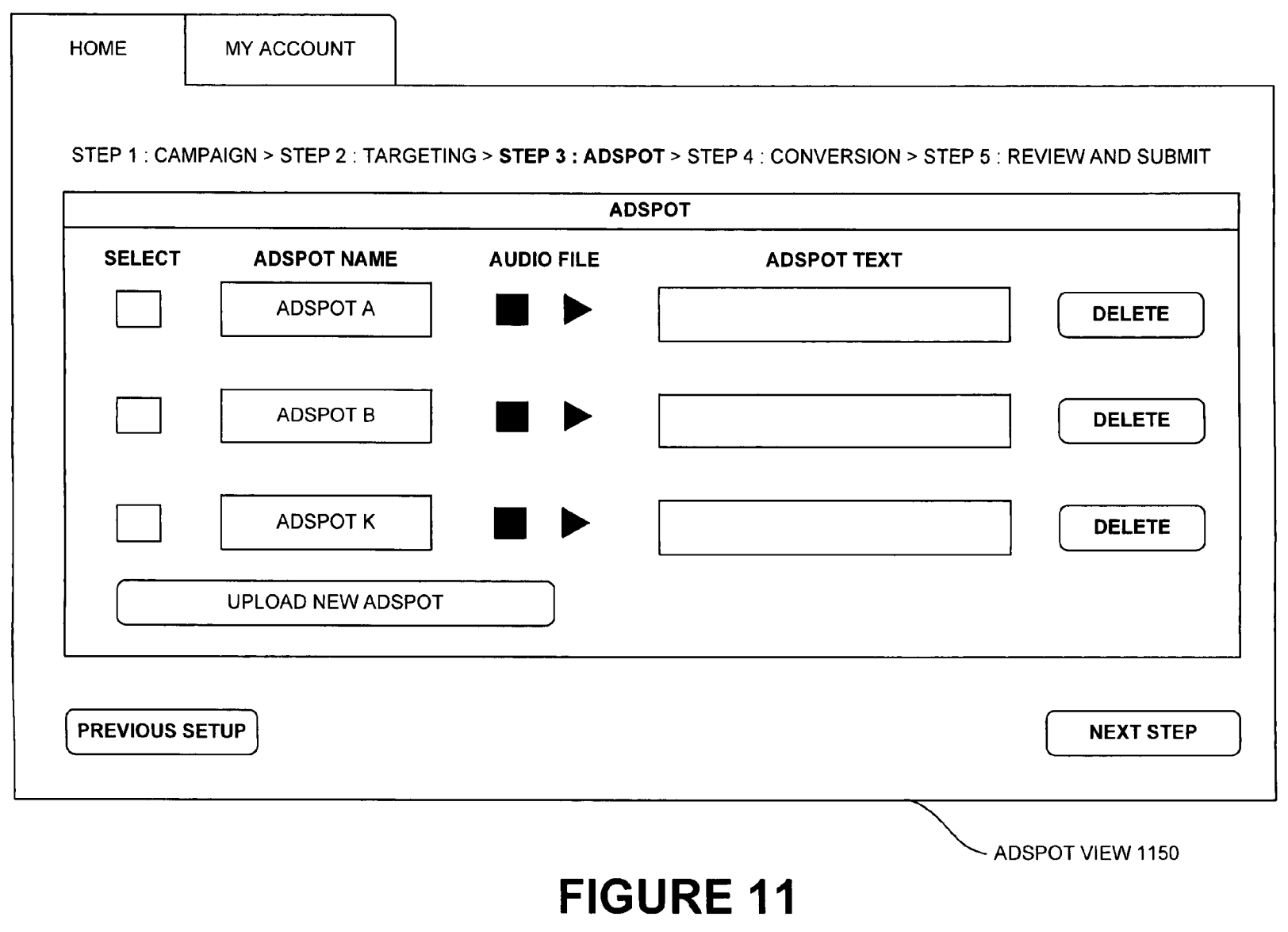

FIG. 11 is an interface view of an adspot view 1150, according to one embodiment. For example, adspot view 1150 may display the select, adspot name, audio file, adspot text options. The adspot view 1150 may also include upload new adspot option which may facilitate to upload a new adspot. Also the adspot view 1150 may include the delete option that may facilitate to delete the previously loaded adspot. The user (e.g., the user 106 of FIG. 1) may also play the audio file already uploaded.

FIG. 12 is an interface view of a conversion view 1250, according to one embodiment. The conversion view 1250 may be associated with the conversions of ad, sending of the SMS, and an option to hear an audio file. In example embodiment illustrated in FIG. 12, the conversion view 1250 may display conversion ad option that may facilitate to connect to the number as per the requirement of the user (e.g., the user 106 of FIG. 1). The conversion view 1250 may facilitate the user (e.g., the user 106 of FIG. 1) to write the message text and may also provide an option to send the message to the SMS enabled phone. Also the conversion view displays an extended audio option that may enable the user (e.g., the user 106 of FIG. 1) to hear an extended audio message. Also the status of the extended audio and the SMS message text may be displayed in the conversion view.

Figure 13A:
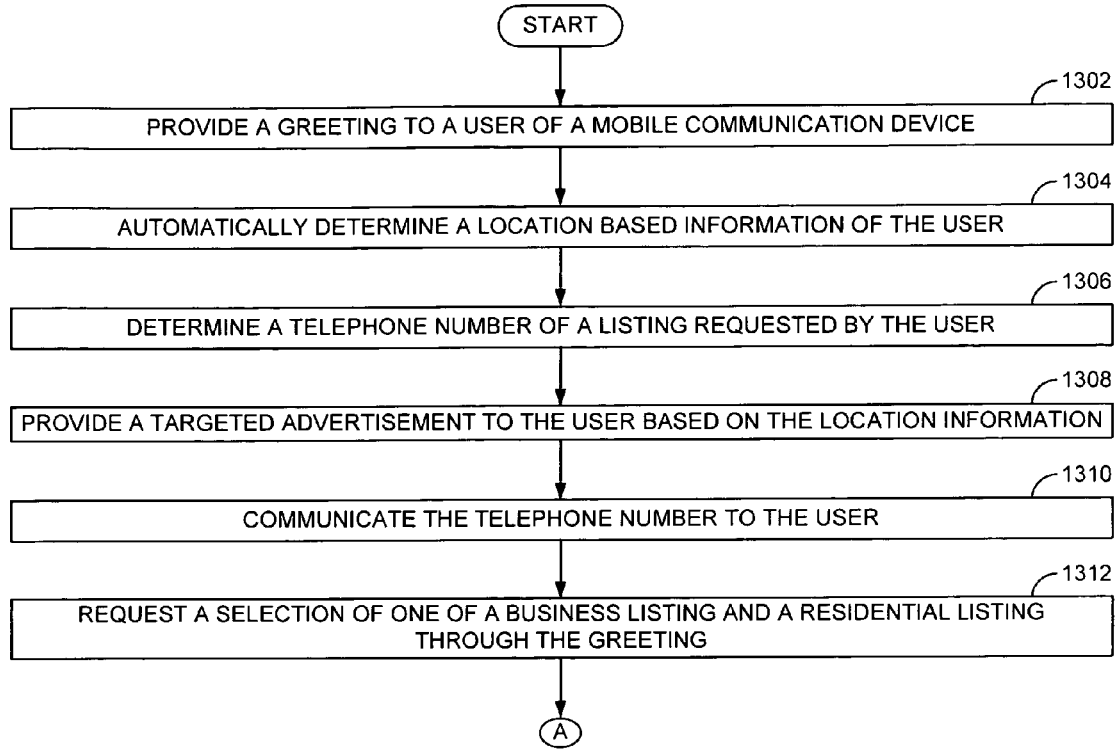
FIG. 13A is a process flow of providing a greeting to a user, according to one embodiment.

FIG. 13A is a process flow of providing a greeting to the user (e.g., the user 106 of FIG. 1), according to one embodiment. In operation 1302, a greeting may be provided to a user (e.g., the user 106 of FIG. 1) of a mobile communication device (e.g., a client device(s) 102 of FIG. 1). In operation 1304, location based information of the user (e.g., the user 106 of FIG. 1) may be automatically determined. In operation 1306, a telephone number of a listing may be determined requested by the user (e.g., the user 106 of FIG. 1). In operation 1308, a targeted advertisement to the user (e.g., the user 106 of FIG. 1) may be provided based on the location information. In operation 1310, the telephone number may be communicated to the user (e.g., the user 106 of FIG. 1). In operation 1312, a selection of one of a business listing and a residential listing may be requested through the greeting.

Figure 13B:
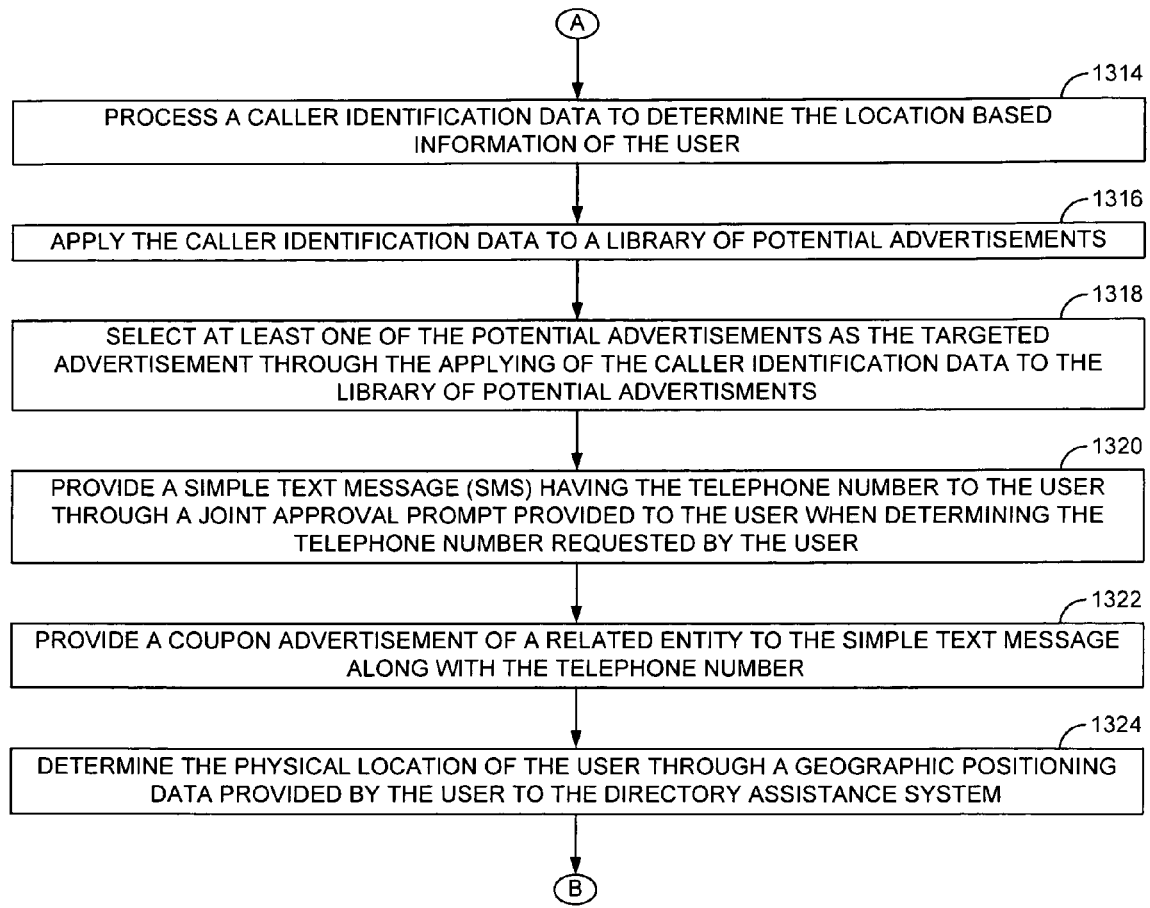
FIG. 13B is a continuation of the process flow of FIG. 13A showing additional processes, according to one embodiment.

FIG. 13B is a continuation of the process flow of FIG. 13A showing additional processes, according to one embodiment. In operation 1314, a caller identification data may be processed to determine the location based information of the user (e.g., the user 106 of FIG. 1). In operation 1316, the caller identification data may be applied to a library of potential advertisements. In operation 1318, at least one of the potential advertisements as a targeted advertisement may be selected through the applying of the caller identification data to the library of potential advertisements. In operation 1320, a Simple Text Message (SMS) having the telephone number to the user (e.g., the user 106 of FIG. 1) may be provided through a joint approval prompt provided to the user (e.g., the user 106 of FIG. 1) when determining the telephone number requested by the user (e.g., the user 106 of FIG. 1).

In operation 1322, a coupon advertisement of a related entity may be provided to the Simple Text Message along with the telephone number. Alternatively, in operation 1322, an advertisement (e.g., coupon or otherwise) of a related entity to the Simple Text Message may be provided along with the telephone number, and wherein the advertisement includes a trackable revenue generating number that is any one of a toll free number and a local number directly in an Simple Text Message body. In operation 1324, a physical location (e.g., a physical location module 142 of FIG. 1) of the user (e.g., the user 106 of FIG. 1) may be determined through a geographic positioning data provided by the user (e.g., the user 106 of FIG. 1) to a directory assistance system (e.g., a directory assistance system module 100 of FIG. 1).

Figure 13C:
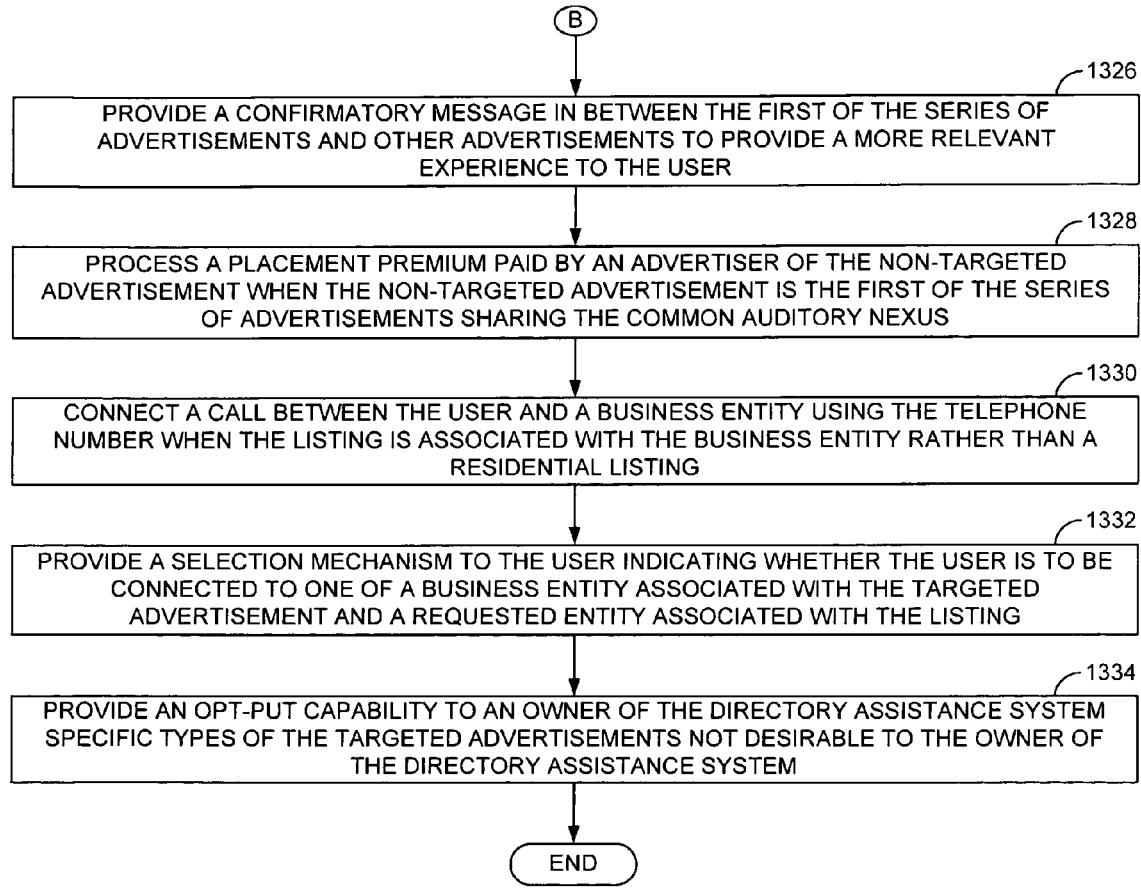
FIG. 13C is a continuation of the process flow of FIG. 13B showing additional processes, according to one embodiment.

FIG. 13C is a continuation of the process flow of FIG. 13B showing additional processes, according to one embodiment. In operation 1326, a confirmatory message may be provided in between the first of the series of advertisements and other advertisements to provide a more relevant experience to the user (e.g., the user 106 of FIG. 1). In operation 1328, a placement premium paid by an advertiser of the non-targeted advertisement may be processed when the non-targeted advertisement may be the first of the series of advertisements sharing the common auditory nexus. In operation 1330, a call between the user (e.g., the user 106 of FIG. 1) and a business entity using the telephone number may be connected when the listing may be associated with the business entity rather than the residential listing. In operation 1332, a selection mechanism to the user (e.g., the user 106 of FIG. 1) may be provided indicating whether the user (e.g., the user 106 of FIG. 1) is to be connected to one of a business entity associated with the targeted advertisement and a requested entity associated with the listing, wherein the selection mechanism provides a priority to the business entity associated with the targeted advertisement over the requested entity associated with the listing. In operation 1334, an opt-out capability may be provided to an owner of the directory assistance system (e.g., a directory assistance system module 100 of FIG. 1) of specific types of the targeted advertisements not desirable to the owner of the directory assistance system (e.g., a directory assistance system module 100 of FIG. 1).

Figure 14:
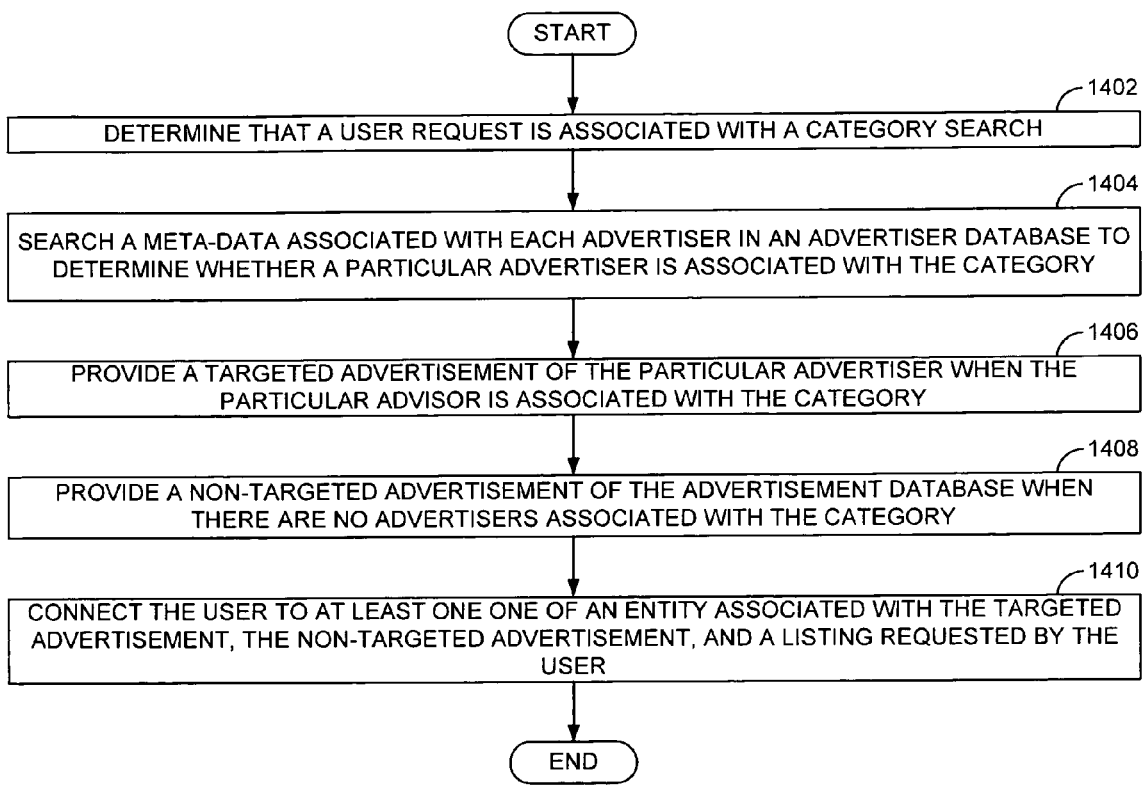
FIG. 14 is a process flow of determining the user associated with a category search, according to one embodiment.

FIG. 14 is a process flow of determining whether the user is associated with a category search, according to one embodiment. In operation 1402, the user (e.g., the user 106 of FIG. 1) request associated with a category search may be determined. In operation 1404, a meta-data associated with each advertiser in an advertiser database may be searched to determine whether a particular advertiser is associated with the category. In operation 1406, a targeted advertisement of the particular advertiser may be provided when the particular advertiser is associated with a category. In operation 1408, a non-targeted advertisement of the advertisement database may be provided when there are no advertisers associated with the category. In operation 1410, the user (e.g., the user 106 of FIG. 1) may be connected to at least one of an entity associated with the targeted advertisement, the non-targeted advertisement, and a listing requested by the user (e.g., the user 106 of FIG. 1).

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated ASIC circuitry and/or in Digital Signal; Processor DSP circuitry). For example, the directory assistance module, the advertising module, and a listings module, and other modules of FIGS. 1-14 may be embodied through a directory assistance circuit, an advertising circuit, a listing circuit, and other circuits using one or more of the technologies described herein.

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

What is claimed is:

1. A method comprising:
   receiving a call at a directory assistance system from a client device;
   receiving caller identification information associated with the client device;
   determining a location associated with the client device based on the caller identification information;
   in response to receiving the call and the caller identification information, sending a first targeted advertisement to the client device, wherein the first targeted advertisement is chosen based on the location associated with the client device;
   receiving search criteria associated with a requested listing;
   determining information associated with the requested listing based on the search criteria; and
   sending a short message service message from the directory assistance system to the client device, wherein the short message service message includes a second targeted advertisement and the information associated with the requested listing, wherein the second targeted advertisement is chosen based on the search criteria, wherein the second targeted advertisement includes a trackable telephone number corresponding to an advertiser associated with the second targeted advertisement, and wherein an advertising fee is charged to the advertiser in response to the client device initiating a call to the trackable telephone number,
   wherein the first targeted advertisement, the second targeted advertisement, and the information associated with the requested listing are provided to the client device at predetermined time intervals.

2. The method of claim 1, wherein the search criteria indicate a listing directory to be used to locate the requested listing, wherein the listing directory is one of a business finder directory and an operator assisted directory, wherein the business finder directory includes a set of business finder listings, each business finder listing associated with a business entity that has paid a fee to be included in the business finder directory, and wherein the information associated with the requested listing is determined from the set of business finder listings if the search criteria indicate the business finder directory and the information associated with the requested listing is determined from the operator assisted directory if the search criteria indicate the operator assisted directory.

3. The method of claim 2, wherein the first targeted advertisement and the second targeted advertisement are chosen from a set of targeted advertisements, and wherein the set of targeted advertisements includes a particular targeted advertisement for each business finder listing in the set of business finder listings.

4. The method of claim 2, wherein each business finder listing in the set of business finder listings is associated with meta-data, and wherein the information associated with the requested listing corresponds to a particular business finder listing associated with meta-data that matches a geographic location included in the search criteria.

5. The method of claim 3, further comprising:
   sending a third advertisement to the client device; and
   providing a selectable option to connect the client device to one of a business entity associated with the third advertisement and an entity associated with the requested listing, wherein the selectable option to connect the client device to the business entity is presented prior to the selectable option to connect the client device to the entity associated with the requested listing.

6. The method of claim 1, wherein determining the location associated with the client device includes determining at least one of a region of a user of the client device, a state of the user, a country of the user, an identifier number of the user, and a physical location of the user.

7. The method of claim 1, wherein the first targeted advertisement is associated with a business entity that incurs a fee when the first targeted advertisement is sent to the client device.

8. The method of claim 1, wherein the requested listing is associated with a first business entity and the advertiser associated with second targeted advertisement corresponds to a second business entity that is a competitor of the first business entity.

9. The method of claim 8, wherein the short message service message includes a selectable option to connect the client device to the second business entity.

10. The method of claim 1, wherein a user of the client device incurs a fee associated with the short message service message.

11. The method of claim 1, further comprising providing the information associated with the requested listing and a set of alternate listings from the directory assistance system to the client device, wherein the set of alternate listings includes a set of unpaid listings and a set of internet listings.

12. The method of claim 11, wherein each alternate listing of the set of alternate listings is chosen based on the search criteria.

13. The method of claim 12, wherein each alternate listing of the set of alternate listings includes a selectable option to receive additional information about the alternate listing.

14. The method of claim 5, wherein a non-targeted advertisement is chosen as the third advertisement.

15. The method claim 14, wherein the non-targeted advertisement is chosen from the set of targeted advertisements based on geographic location included in the search criteria.

16. A directory assistance system comprising:
a processor coupled to memory, wherein the memory comprises instructions that, when executed by the processor, cause the processor to perform operations including:
receiving a call from a client device;
receiving caller identification information associated with the client device;
determining a location associated with the client device based on the caller identification information;
sending a first targeted advertisement to the client device, wherein the first targeted advertisement is chosen based on the location associated with the client device, and wherein the first targeted advertisement is sent in response to receiving the call and the caller identification information;
receiving search criteria associated with a requested residential listing;
determining information associated with the requested residential listing based on the search criteria; and
initiating transmission of a short message service message to the client device, wherein the short message service message includes a second advertisement and the information associated with the requested residential listing, wherein the second advertisement is chosen based on the search criteria, wherein the second advertisement includes a trackable telephone number corresponding to an advertiser associated with the second advertisement, and wherein an advertising fee is charged to the advertiser when the client device initiates a call to the trackable telephone number.

17. The system of claim 16, wherein the search criteria indicate a listing directory of a plurality of listing directories to be used to locate the requested residential listing, wherein the plurality of listing directories includes a business listing directory and a residential listing directory, wherein the business listing directory includes a set of business listings, each business listing associated with a business entity that has paid a fee to be included in the business listing directory, and wherein the information associated with the requested residential listing is determined from the residential listing directory in response to the search criteria indicating the residential listing directory, and wherein the business listing directory is used to determine a requested business listing when the search criteria indicate the business listing directory.

18. The system of claim 17, wherein the first targeted advertisement and the second advertisement are chosen from a set of targeted advertisements, and wherein the set of targeted advertisements includes an advertisement for each business listing of the set of business listings.

19. A computer-readable storage device comprising operational instructions that, when executed by a processor, cause the processor to perform operations comprising:
receiving a call from a client device;
receiving caller identification information associated with the client device;
determining a location associated with the client device based on the caller identification information;
sending a first advertisement to the client device, wherein the first advertisement is chosen based on the location associated with the client device, and wherein the first advertisement is sent in response to receiving the call and the caller identification information;
receiving search criteria associated with a requested listing;
determining information associated with the requested listing based on the search criteria; and
initiating transmission of a short message service message to the client device, wherein the short message service message includes a second advertisement and the information associated with the requested listing, wherein the second advertisement is chosen based on a geographic location included in the search criteria, wherein the second advertisement includes a trackable telephone number corresponding to an advertiser associated with the second advertisement, and wherein an advertising fee is charged to the advertiser in response to the client device initiating a call to the trackable telephone number.

* * * * *